United States Patent [19]

Varrasso et al.

[11] 4,251,475
[45] Feb. 17, 1981

[54] METHOD AND APPARATUS FOR CONTROLLING THE PROPORTION OF LIQUID AND DRY PARTICULATE MATTER ADDED TO A PELLETIZER

[75] Inventors: Eugene C. Varrasso, Heath; Richard K. Henry, Newark, both of Ohio

[73] Assignee: Owens-Corning Fiberglas Corporation, Toledo, Ohio

[21] Appl. No.: 974,456

[22] Filed: Dec. 29, 1978

[51] Int. Cl.³ ................ B01J 2/12; B28B 17/00; B29B 1/03; C09C 1/28

[52] U.S. Cl. ................ 264/40.1; 23/230 A; 23/313 R; 23/313 P; 264/117; 364/500; 422/111; 425/140; 425/222; 425/DIG. 101

[58] Field of Search ........... 23/313 R, 313 AS, 313 P, 23/230 A; 264/40.1, 40.4, 40.7, 117; 425/140, 141, 145, 222, DIG. 101; 364/108, 496, 500, 502; 422/110, 111

[56] References Cited

U.S. PATENT DOCUMENTS

| | | | |
|---|---|---|---|
| 3,656,911 | 4/1972 | Hobbs | 23/230 A X |
| 3,733,473 | 5/1973 | Child et al. | 23/230 A X |
| 3,883,281 | 5/1975 | Holley | 425/222 |
| 3,951,604 | 4/1976 | Smith et al. | 364/500 X |
| 4,091,060 | 5/1978 | Carter et al. | 425/222 X |
| 4,131,668 | 12/1978 | Sasaki et al. | 264/40.4 X |

*Primary Examiner*—Joseph Scovronek
*Attorney, Agent, or Firm*—Ronald C. Hudgens; Patrick P. Pacella; Joel I. Rosenblatt

[57] ABSTRACT

A method and apparatus are provided for controlling the amount of dry particulate matter and liquid added to a rotary pelletizer. A transducer placed within the pelletizer senses a characteristic of the mixed material in the pelletizer. This characteristic may be, for example, the level of the batch or the size of the pellets. The transducer signal is then conditioned to provide a signal level corresponding to a desired characteristic level and which varies about that level corresponding for example to the variations of pellet size about a desired size. That signal is added to a second signal representing the actual liquid flow into the pelletizer or added to a second signal representing actual dry particulate flow into the pelletizer and modulates that respective flow to maintain the input of either the dry or the liquid material into the pelletizer as necessary. Additionally, a set point signal can be provided as a constant signal representing desired dry particulate in flow or liquid in flow. The dry or the liquid signal also can be derived from the respective actual liquid or dry signal by taking a proper proportion of the other signal. Additionally, a method and apparatus is shown for controlling the liquid input to the pelletizer in response to the actual dry material flow into the pelletizer so that the correct proportion of liquid to dry particulate is always maintained regardless of the actual flow.

12 Claims, 5 Drawing Figures

METHOD AND APPARATUS FOR CONTROLLING THE PROPORTION OF LIQUID AND DRY PARTICULATE MATTER ADDED TO A PELLETIZER

FIELD OF THE INVENTION

This invention relates to control systems for a pelletizer and particularly pelletizers where liquid and dry particulate matter are combined as in a rotary pelletizer, and further where the pellets may be used in a melting furnace such as a glass furnace.

BACKGROUND

It has been found to be advantageous to collect the hot combustion gases produced in a glass melting furnace or unit and to pass them in heat-exchange relationship with the batch material being supplied to the melting furnace. The batch can thus be preheated to elevated temperatures to save significant amounts of energy subsequently required to melt the batch. The exhaust gases otherwise are simply expelled to the atmosphere in many instances with a considerable waste of heat and energy.

Preferably, the heat-softenable batch material is in the form of balls or pellets in the heat-exchange chamber through which the hot gases are passed. However, it has been discovered that the pellet size must be substantially uniform. Otherwise, pellets of varying sizes tend to nest and provide excessive restriction to the flow of the gases past the pellets in the chamber. It has also been discovered that pellets size is important in addition to uniformity. If the pellets are too small, again undue restriction to the flow of the hot gases results. If the pellets are too large, their surface-to-weight ratio is accordingly reduced and the heat transferred to them is accordingly decreased. Also, trapped moisture in the larger pellets may turn to steam and cause the pellets to explode. Specifically, it has been found that pellets of one-half inch nominal diameter with a range from three-eights inch to five-eights inch in diameter are the ultimate for obtaining maximum heat transfer from the hot exhaust gases to the pellets.

The pellets of the heat-softenable batch material preferably are made in a modified commercially-available pelletizer. The components of the batch are mixed together and then supplied to the pelletizer. During transportion to the pelletizer, the batch components tend to segregate so that the actual batch supplied to the pelletizer will vary, even though the final pellets produced and supplied to the melting furnace or unit average out so that the short variations are not material. However, the short variations in the batch components tend to affect the pellet-forming ability of the batch and the size of the pellets produced, other factors being constant. The feed rate of the batch to the pelletizer will also vary and thereby also affect pellet forming and pellet size. Liquid, and specifically water, is also supplied to the pelletizer with the batch supply. With the batch component or quantity variation, different size pellets will result when the water quantity is held constant. However, it has been found that the water quantity, or the ratio of the batch to the water, will also affect the pellet size, with more water resulting in larger pellets and less water resulting in smaller pellets, at least in most instances.

It has also been discovered that measuring a characteristic of the batch in the pelletizer during the formation of the pellets can result in forecast or prediction of pellet size so that the quantity of water or batch to water ratio can be changed to avoid an undesired increase or decrease in pellet size prior to its happening. For example, the depth of the batch material in the pelletizer at certain portions thereof can be measured and the water flow changed accordingly. An increased depth of the nuclei or seed of the batch material indicates that water content is higher, the water tending to cause the seeds to stick together more and thus build up higher. Consequently, the amount of water supplied to the pelletizer is reduced when the sensing device indicates that the batch depth has reached a predetermined value. The excess water would otherwise tend to make fewer but larger diameter pellets, if not reduced. At the same time, if there is too little water, the depth of the nuclei or seeds of the batch decreases with the amount of water then being increased. The lesser amount of water otherwise would result in the individual final pellets thereby being smaller but in greater quantity.

Among the pertinent prior art is a U.S. Pat. application of Stephen Seng Ser. No. 809,595 filed June 24, 1977, which is assigned to the common assignee with this application. That disclosure substantially describes the foregoing. Additionally, an application of Richard K. Henry, Ser. No. 974,470, which was filed on Dec. 29, 1978, now abandoned, a continuation-in-part application, Ser. No. 095,268, having been filed Nov. 29, 1979, both of which are assigned to the common assignee disclose directly sensing pellet size as a sensed characteristic and proportionally controlling the liquid inflow responsively.

However, regardless of the type of characteristic measured and the type of particulate matter or liquid being used in the pelletizer, both the prior application of Seng and the co-pending application of Henry indicate that control of the proportion of dry and liquid material is necessary in order to control the quality of the pellets being produced in the pelletizer.

The co-pending application of Richard K. Henry further indicates that it is also desirable to control the amount of liquid to the amount of dry material going into the pelletizer. This means that within practical limits, certain pellet compositions require a strict proportion of liquid to dry particulate matter be maintained in the pelletizer and that any variation in either the liquid or dry particulate matter be matched by a proportional compensating adjustment for the dry or the liquid matter respectively going to the pelletizer.

Additional prior art references, are U.S. Pat. Nos. 4,031,175 and 3,277,218 which show proportional control of the liquid in flow. However, they do not show a rotary pelletizer wherein a varying characteristic of the material is sensed and the transduced signal is conditioned to match the variations of the characteristic about a desired level. They further do not show a modulator circuit as necessary to match the input requirements of a large control system while producing a signal matching the variations of the material in the pelletizer.

SUMMARY OF THE INVENTION

In accordance with the objects associated with the wide range of materials used in the pelletizer as well as the control needs of the varying compositions, the following method and apparatus is disclosed.

This pelletizing control method and apparatus is designed for use with glass batch compositions to form heat softenable pellets but may be used in a greater variety of pelletizing operations and the principals of this invention should not be thought of as being limited to either glass batch pellets or even more generically to heat softenable pellets but may be applied to any type of pellet forming operation.

In accordance with the invention, a varying characteristic of the material in the pelletizer is sensed and this characteristic is controlled in turn to control the characteristics of the pellets being produced.

A transducer is used to sense this characteristic and then means are provided to generate a conditioned first signal responsive to the sensed varying characteristic to ultimately control the quality of pellets. This first signal is conditioned to have a predetermined level corresponding to a predetermined characteristic level. The signal modulates or deviates from the predetermined level responsive to the variations in the said characteristic level about the desired predetermined characteristic level.

The first signal then is made responsive to the material's varying characteristic and more particularly matches it. It has a level corresponding to the desired level of the varying characteristic and varies about its level as the characteristic in the pelletizer varies about its own respective level. The first signal modulates about a desired level corresponding to the desired characteristic level.

Recognizing that in pelletizers, it is desired to maintain the correct proportion of one ingredient to another ingredient or particularly of liquid to dry particulate material, either the rate of the dry particulate material into the pelletizer or the rate of liquid into the pelletizer may be sensed to generate the second signal. This second signal similar to the first signal also has a level corresponding to a desired input rate and deviates about that desired input rate responsive to the deviation of one ingredient input rate, the liquid or dry input rate.

The first and second signals may be combined to produce a fourth signal having a predetermined level which corresponds to both the first and second signals being at their respective predetermined levels and to the said varying characteristic being at its predetermined characteristic level and with the fourth signal deviating about its respective level corresponding to the deviation of the first and second signal deviating about their respective levels and responsive to the characteristic within the pelletizer varying about its predetermined characteristic level.

Further in accordance with this control scheme, the first and second signals, or the fourth signal is then compared with a reference level third signal to produce an error signal. This error signal is then minimized to bring the modulated first signal to its predetermined level, indicating that the characteristic is being maintained at its predetermined level.

The reference level can be actual measured inflow for the other ingredient or may be artificially generated to indicate desired or assumed level for the other ingredient or may be artifically generated to indicate a desired level for the said one ingredient.

For example, the dry particulate rate provided as a signal level by a signal generator can be further conditioned by a constant K to generate the set point third signal for the liquid rate into the pelletizer. This liquid rate would be a proportion of the dry rate and would represent the proper liquid input rate for the desired or actual dry particulate rate chosen. This derived reference level third signal is then a set point, and compared with the first and second signals to generate the error signal.

For example an actual dry particulate rate signal, provided by a dry particulate flow transducer, could be used in place of the dry particulate rate set point artificially generated level signal. In this case, the same proportional liquid signal would be derived and used as the third signal reference level set point signal so that the rate of liquid input to the pelletizer is always in the same required proportion regardless of a change in the actual feed rate for the dry particulate material. In this case the dry particulate input rate need not be controlled as the liquid input rate would be controlled instead to provide the correct proportion of liquid regardless of any change in the dry particulate in flow. In this way the same quality of pellets and the same predetermined characteristic level within the pelletizer would be produced.

In furtherance of the control system for the operation of the pellets and in particular the pelletizer and in particular the production of the pellets, a unique modulator circuit is shown. This modulator circuit provides two sections each capable of providing a predetermined level signal corresponding to the said varying characteristic predetermined level and capable by itself of producing the said first signal to match or duplicate the movement of the characteristic about its predetermined characteristic. In addition the two sections may be combined to provide even greater versatility as may be necessary in a pelletizer control system to match the output of the pelletizer to an analogue or digital control system.

In this regard, a first section has an integrating amplifier to smooth out variations in the transducer output and an adjustment circuit which may be used to provide the said predetermined level at the output of the amplifier corresponding to the predetermined characteristic level in the pelletizer. The output of the integrating amplifier could then be the said first signal having a predetermined level corresponding to the predetermined characteristic level and varying about that level responsive to variations of the characteristic about its predetermined characteristic level. The output of the integrating amplifier can be connected directly to a control system.

A second section of the modulator uses a feedback amplifier to produce a signal which is then modified in level to provide a modified feedback input to the amplifier, with that modified level corresponding to the predetermined level of the characteristic. The amplified output of a feedback amplifier may be adjusted in sensitivity to control its response, responsive to the input of the amplifier. This sensitivity corresponds to the rate of change of the feedback amplifier output to a change in transducer output or input from the integrating amplifier. This second amplifier may be connected at its input to the transducer to provide a conditioned signal having a level and a sensitivity which may be modified to match the needs of a control system connected to the feedback amplifier output and wherein the feedback amplifier then produces a signal having the said predetermined level corresponding to the varying characteristic level and varying about that level in response to the variations of the characteristic.

As stated, the input of the feedback amplifier may be connected directly to the transducer or may be connected to the transducer through the output of the integrating amplifier where the integrating amplifier adjustment circuit would be used as a one to one amplifier.

The first and second circuits could be used cooperatively to provide greater versatility within the control scheme. This greater versatility is provided, for example, by using the integrating amplifier to operate a display device which displays the motion of the characteristics as it varies about its predetermined characteristic level while serving as an input to the second portion of the modulating device. The second portion of the modulating device may condition the output of the integrating amplifier again to provide the said signal level responsive to the predetermined characteristic level and an output varying about the level and further provide the necessary conditioned signal to the input of a larger control system for controlling the inflow of either water or dry particulate to the pelletizer. In this case, both the means for adjusting the signal level of the integrating amplifier and the means for modifying the signal level of the feedback amplifier to obtain a desired predetermined first signal level responsive to the level of the predetermined level of the varying characteristic as well as the sensitivity of the feedback amplifier are controlled to maintain the proper amplitude for use in driving the further portions of the control system.

Further in accordance with this invention and where the sensor within the pelletizer is placed in operation subsequent to the said varying characteristic reaching its predetermined level, the first portion of the modulator circuit may be separately adjusted with respect to the transducer to zero the transducer output level with respect to the predetermined characteristic level and to separately inspect the transducer outut level to insure it is operating properly. At the same time the second portion of the modulating circuit can be separately adjusted to provide the critical conditioned signal input required for the input to the control system.

The characteristic itself may be sensed physically by a paddle as shown in this disclosure or any other type of suitable transducer. What is important is that the characteristic sensed varies in proportion to the amount of water and dry particulate being added to the pelletizer. As stated above the principles of this invention are not restricted by the type of transducer used or whether the characteristic is measured inside or outside the pelletizer. For example, the characteristic measured could be finished pellet size as shown in copending application of E. Varrasso, Ser. No. 974,418, filed Dec. 29, 1978, and assigned to the common assignee.

This invention accomplishes this control by providing a unique control scheme which may be used to maintain an input flow rate for liquid, for example, corresponding to an assumed dry particulate input or may maintain the liquid input rate corresponding to an actual dry particulate rate as that dry particulate rate changes in accordance with changes in the process means or materials.

Further a modulator circuit is provided for conditioning the transducer output to accurately match the changing phenomena of the said sensed characteristic while affording the opportunity to adjust the signal output to match the needs of a larger control system. The modulator also provides the versatility which may be used to connect its output to various display devices and other control means. A further advantage is provided by the modulator circuit permitting a human operator to initiate the process by placing the transducer in operation at his discretion and by allowing him to monitor and adjust the system and control parameters.

DESCRIPTION OF THE PREFERRED EMBODIMENT

Figure 1:
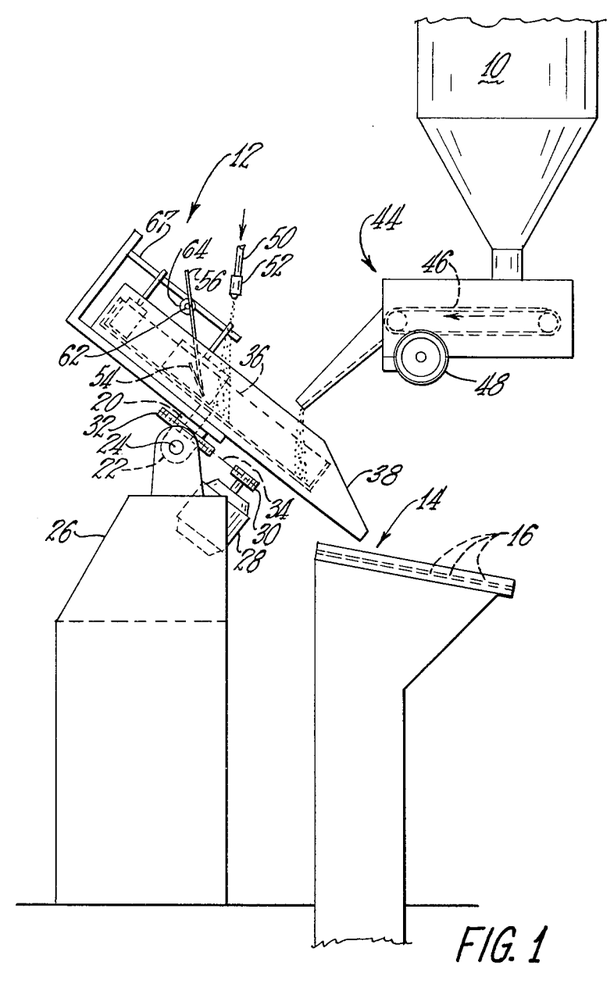
FIG. 1 is a schematic view in elevation of apparatus of forming batch material into pellets.

Referring to FIG. 1, particulate, heat-softenable glass batch material is transported to a supply hopper 10 and subsequently supplied to a pelletizer 12. The particulate batch material is formed into pellets which are discharged onto a trough 14 having openings 16 therein through which smaller or broken pellets can be separated. The pellets can be supplied to a suitable vertical conveyor and carried to the top of a heat-exchange hopper forming a heat-exchange chamber. The pellets then move down to a melting furnace after being preheated with hot combustion gases therefrom in the chamber. A substantial increase in efficiency of the furnace is thereby achieved.

As previously recognized, size uniformity of the pellets is important, since if the size varies too much the pellets tend to nest together and excessively restrict the flow of exhaust gases through the heat-exchange chamber. The actual diameter is also important because if the pellets are too small they produce excessive restriction to the flow of gases, and if the pellets are too large, the surface-to-weight ratio is less and less heat is transferred to them. Further the larger pellets may have moisture trapped therein and explode when the moisture turns to steam. Pellets having a nominal diameter of one-half inch, with a range of three-eighths to five-eighths inch, have been found to be the ultimate for obtaining the maximum heat transfer from the hot combustion gases to the pellets.

The pelletizer 12 forms the batch material into the one-half inch nominal diameter pellets when the conditions are properly adjusted. The components of the batch material supplied to the pelletizer 12 from the supply hopper 10 may segregate during transportation. The segregation is not harmful to the operation of the glass furnace since the components of the pellets average out over a period time. However, the short variations in the batch components affect the pellet-forming ability of the batch material. Thus, variations in components of the batch material supplied to the pelletizer 12 will result in change in pellet size when other factors remain constant. The feed rate of the batch to the pelletizer may also vary and again change the pellet-forming ability and the pellet size. Segregation and variation in certain batch compositions are more critical than for many others, rendering close control of liquid quantity very important.

The quantity of liquid or the ratio of the liquid to the batch material affects the pellet size, with an increase in the amount of liquid or water or increase in the ratio resulting in larger pellets, with less water resulting in smaller pellets. It has been found that by measuring a characteristic, for example the size or diameter, of the partly-formed pellets moving in a downward path on the pelletizing disc, or the depth of the batch, the water quantity can be controlled proportionally. Larger pellets indicate that there is more water and that the quantity should be reduced while smaller pellets indicate less water and that the quantity should be increased.

Figure 2:
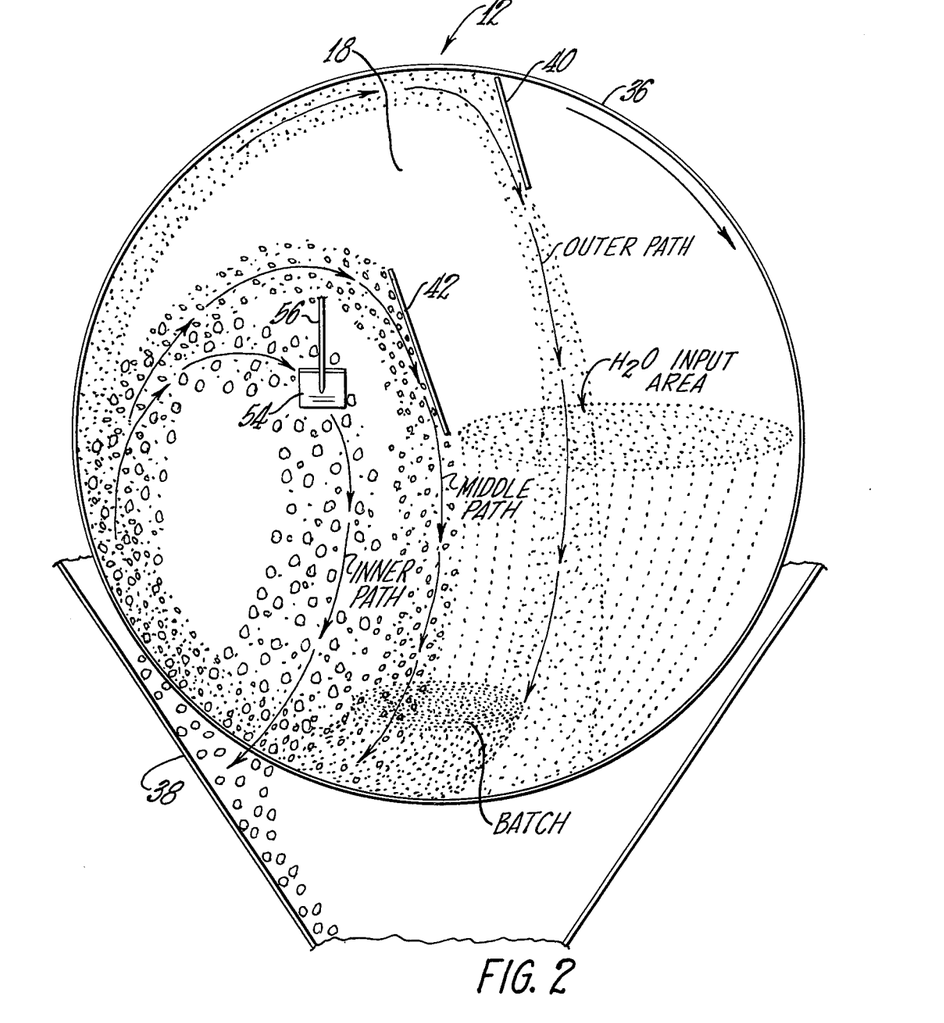
FIG. 2 is an enlarged diagrammatic view of the disc of the pelletizing apparatus in FIG. 1.

Referring to FIGS. 1 and 2 the means for forming pellets is shown as and may include the pelletizer 12 and movable surface 18 in the form of a rotatable member or disc. The disc 18 is rotatably carried on a bearing housing 20 (FIG. 1) which is pivotally mounted on ears 22. The ears 22 are carried on an axle 24 which is mounted on a stand 26. The disc 18 is rotated by a motor 28 through drive and driven sprockets 30 and 32 and a chain 34. The disc 18 is surrounded by an annular partition or wall 36, with the pellets tumbling over the wall and down a spout 38 to the trough 14 when they are of final size. An outer plow 40 and an inner plow 42 scrape and clean the surface of the disc 18.

Batch from the supply hopper 10 is fed to a lower central portion of the disc 18, as indicated in FIG. 1, by a suitable feeder 44 (FIG. 1). The feeder is shown as having a belt conveyor 46 driven by a motor 48. However, other feeders could be employed, such as vibratory ones. While the feeder is intended to supply a constant quantity of batch, as a practical matter, the feed rate of substantially any feeder is subject to some variation. This variation requires changes in the water supplied to maintain pellets of constant size even though the batch components do not vary. In this example, water is supplied to a middle right-hand portion (FIG. 2) of the rotatable disc 18 by a supply line 50 (FIG. 1) and a nozzle 52. The water is supplied in a flat spray at roughly a three o'clock position.

With the disc 18 rotating in a clockwise direction, as shown in FIG. 2, the surface of the disc is slanted at a predetermined angle to the horizontal, such as forty degrees. The batch then moves in generally elliptical paths as it is carried in a clockwise direction up the periphery of the disc and moves down the disc at least partially under the influence of gravity. More specifically, the particulate batch moves in an arcuate upward path around the periphery of the disc 18, adjacent the partition or wall 36. The batch and partly-formed pellets then move downwardly along three rather distinct paths. In the outer path, designated as such in FIG. 2, there are seeds or nuclei of the batch on which the pellets form. In the intermediate or middle path, there are partially-formed pellets generally having diameters in the order of one-fourth inch. In the inner path, there are finished pellets which move in a continuous tight elliptical path until they tumble over the annular partition 36. The three downwardly moving paths are known in the art as "holdup" or "load".

The means for sensing the characteristic of the material may be any suitable transducer. As shown in the preferred embodiment a paddle 54 is positioned in the pelletizer relative to one of the three streams depending on batch composition. Typically, each separate composition would have a preferred paddle location.

Figure 3:
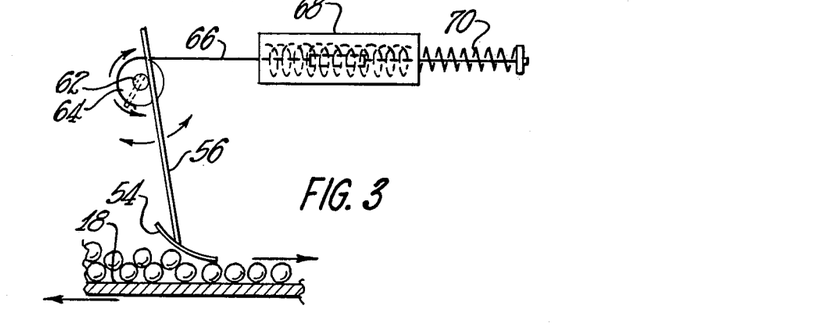
FIG. 3 refers to a type of transducer which may be used to sense the characteristic of the material in the pelletizer and which may be interchanged with any other suitable transducer for producing the required signal indicative of the varying characteristic.

Accordingly, referring to FIG. 3, the stem 56 of the paddle 54 is affixed to a disc 64 on shaft 62 and is affixed to one end of a wire 66. The shaft 62 is mounted on support 67 (FIG. 1) above the pelletizer disc. The wire 66 is connected to a core of a linear transducer 68 with the wire and paddle urged to a downward position by a compression spring 70. The material or batch in the rotary pelletizer then moves the paddle and causes a responsive signal to be produced at the output of transducer 68.

The combination of a paddle and linear transducer is shown as one example for a means for sensing the varying characteristic within the pelletizer and any other suitable sensing means can be used in its place either inside or outside the pelletizer, for sensing the varying characteristic of the mixture.

Figure 4:
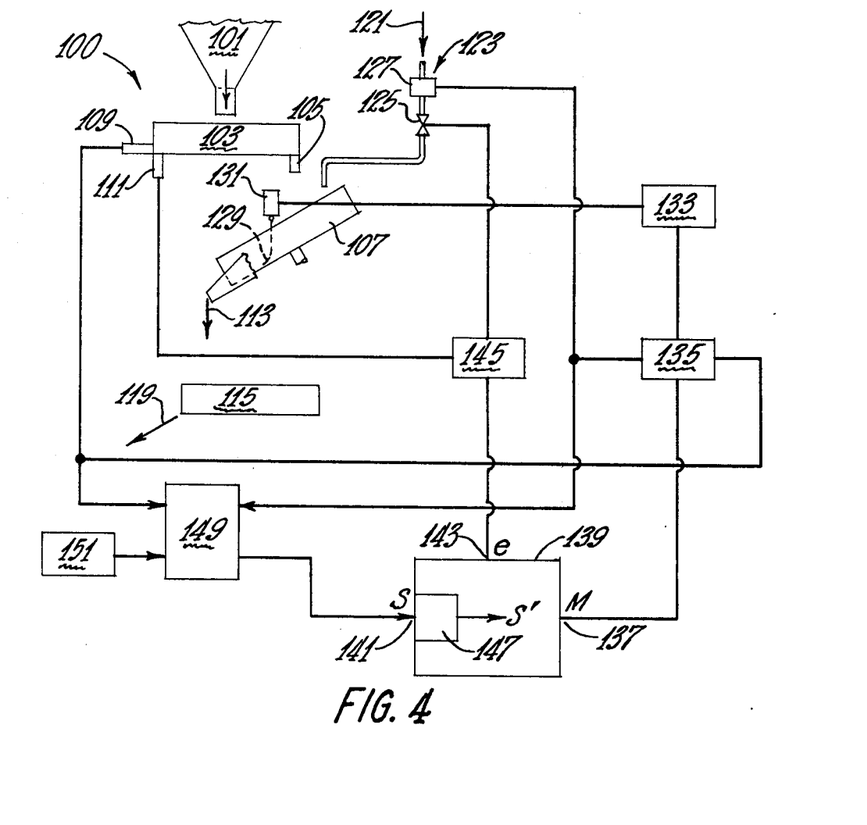
FIG. 4 shows in schematic form the control system including the pelletizer.

FIG. 4 shows the pelletizer and the control system in schematic form.

This invention is a control system for controlling the proportion of at least two ingredients mixed in a pelletizer to form pellets and for controlling the size of the pellets. The invention senses a characteristic of the mixture within the pelletizer and produces a first signal responsive to that sensed characteristic. It senses a flow rate for one of the said ingredients and produces a second signal responsive to that flow rate. It produces a reference level third signal which is then used as a set signal and compared with the first and second signals to produce an error signal. The error signal is then used to control at least one of the ingredients and to control the proportion of ingredients mixed in the pelletizer.

The reference level third signal is also known as a set signal. It may be derived in a number of ways without departing from the principles of this invention. It may be artificially generated or may be responsive to actual flow rate. Where it is artificially generated, it may represent a pure reference level. As a pure reference level it may be combined either with the first signal for the sensed characteristic or with the second signal for one ingredient or with the combined first and second signals to produce a minimum error signal when the system is in balance: the first signal indicates the sensed characteristic is at the proper level and the second signal indicates the flow rate for one of the said ingredients is at the proper flow rate.

In the most simple form, the control system may compare the first signal, which is indicative of the sensed characteristic level with a reference level to generate an error signal, which may then be used to control the inflow of one ingredient. Alternatively, the first signal may be directly coupled to a controller, which then would generate a control signal, responsive to the said first signal, for controlling one of the ingredients.

When the first and second signals are combined with each other to produce a fourth signal the fourth signal may be combined with the reference level third signal to produce a minimum error signal when the system is in balance.

In use, the reference level third signal may be more than a pure reference level and may be indicative of an actual system parameter or a desired level for a system parameter: it may be the actual flow rate for one of the ingredients or it may be an artificially generated signal indicative of a desired flow rate for one of the ingredients. Where the reference level third signal is indicative of other than the one ingredient represented by the second signal it is converted to a corresponding value or level for the one ingredient before it is used as a set signal and compared with the second signal representing the one ingredient. For example, where the other ingredient is dry particulate and the one ingredient is the liquid, the second signal is then indicative of liquid, and the reference level third signal must be converted by a constant to a new level corresponding to that proportion of liquid flow required to produce the correct size pellets when combined with the dry particulate flow represented by the reference level third signal. Then when the second signal corresponding to liquid flow rate for example is compared to the reference level third signal (set signal), the comparison is between the actual flow rate for the liquid as indicated by the second signal and the reference level or set level for that liquid flow rate. Where the artificially generated reference level third signal is indicative of the one ingredient then no conversion is necessary as the comparison is between the third reference level set signal indicative of a desired level for the one ingredient and the second signal indicative of the actual flow level for the one ingredient.

The principles of this invention may be practiced using any suitable combination of actual or artificially generated signals for the one or the other of the ingredients. For example, the reference level may be an artificially generated level for a desired liquid flow rate representing the first ingredient, where the second signal represents actual liquid flow rate. Or the reference level third signal may represent the actual or desired flow rate for dry particulate where the second signal represents the actual of flow rate for the liquid. In this case the third reference level signal must be converted to a new level representing that proportion of liquid flow rate corresponding to the actual or desired dry flow rate required to form the proper size pellets.

The overall control system refer to generally by numeral 100. As shown, it employs a feeder or batch bin 101 which delivers batch as shown by the arrow through a gravitametric feeder 103. The output of the gravitametric feeder is delivered to a pelletizer 107 through a feed slot 105. The gravitametric feeder additionally has a means 109 for providing an output signal responsive to the rate of flow of the dry particulate into the pelletizer and a means shown as 111 for controlling the rate of the dry particulate input to the pelletizer, which may be made responsive to a control system output. The output of the pelletizer shown by arrow 113 is provided to a means 115 which may be used for further pellet processing. The pelletizer output is then delivered to its end use device as shown in schematic form by arrow 119. The liquid input to the pelletizer is shown by arrow 121 through delivery means 123. Within the delivery means 123 is a liquid control valve 125 and a means 127 for generating a signal responsive to the flow of liquid through delivery means 123. The means for controlling the liquid flow 125 is responsive to the output of the control system while the means 127 provides a signal responsive to that flow as an input to the control system as will be further explained.

A signal generator 151 is provided to artificially generate a reference level signal for a desired liquid or dry particulate flow or may be used to generate a pure reference level signal.

Within the control system, there is shown a further means 129 for sensing a characteristic of the mixture within the pelletizer. In this embodiment, it is a paddle substantially as shown in FIG. 3, placed in the pelletizer and producing an output signal through transducer 131 responsive to the physical displacement of that paddle by the material in the pelletizer. However, this invention should not be thought of as limited to the particular embodiment for the transducer shown within the pelletizer as other suitable means may be used to sense the characteristics of the material in the pelletizer and the principles of this invention should be recognized as applying to a control system for identifying, measuring and controlling a characteristic of the liquid-dry mixture as it changes about a desired level within the pelletizer to produce the desired quality pellets at the output 113.

Further this invention should not be thought of as limited to a particular type of pelletizer as the invention is to the method and apparatus for controlling a characteristic of the liquid-dry mixture as it varies through the formative pellet stages.

The output signal from the sensing means 131 indicating the level of the varying characteristic within the pelletizer is provided to a modulator 133, which is also disclosed in copending application Ser. No. 974,419, which was filed Dec. 29, 1978, and is assigned to the common assignee, is further explained in detail with reference to FIG. 5. The output of that modulator is a signal which has a predetermined level, corresponding to the desired characteristic level. This level in turn for example where a paddle was used would correspond to a desired paddle position or paddle level.

The modulator 133 signal level would then correspond to a predetermined displacement of the paddle producing a predetermined signal output at the paddle transducer 131. For example, as the case of a paddle, the paddle would be displaced about a desired level corresponding to desired pellet size or a desired batch level and produce a varying signal input to the modulator 133. Modulator 133 would then produce a modulated signal output having a level corresponding to a desired displacement of the paddle and varying about that level responsive to the movement of the paddle about its desired displacement level.

In accordance with the principles of the invention the output of, means 127, which is a signal indicating actual liquid flow and the output of modulator 133 are inputted to combining means 135. In the preferred embodiment, means 135 is a summing means. A combined signal is then provided at input 137 of the means for controlling 139. The signal "M" at input 137, represents the signal output of modulator 133, combined with the actual liquid flow rate signal provided by means 127, the M standing for measured or actual value. Also, provided to the controller 139 is a reference level signal shown as a set point signal at input 141 and designated as "S".

The output of the means for controlling 139 is an error signal shown at output port 143 and as signal "e" which is then provided through distributing means 145 to either the means for controlling the liquid flow 125 or means for controlling the dry particulate flow 111.

The algorithm used by controller 139 may use a proportional and integral algorithm to generate error signal e and expressed as $$e = K_1(S-M) + K_2 \int (S-M)dt$$

where S is the reference level shown as a set point signal at port 141 or converted by means 147 to S' as explained below and M is the measured signal. However, other known control algorithms may be used to generate the error signal, such as either strict proportional, or integral, or derivative or any combination of these functions, consistent with the principles of the invention. A step or discontinuous algorithm may also be used.

The principles of the invention are now described with reference to the example where one ingredient represented by the second signal is liquid and the other ingredient is dry particulate.

It being recognized that for the desired quality of pellets at the output 113, the correct proportion of liquid to dry particulate is required. In this regard, the control means 139 includes means for converting 147 which converts the value of the reference level shown as a set point signal S provided at input port 141 by a constant "K" to produce a new signal S' to the means for controlling 139. S' represents the correct proportion of liquid required for either the desired input rate signal S of dry particulate corresponding to the signal from means 151 or for the actual dry particulate input rate from feeder 103.

S' then may be thought as being related to S by a constant K which is expressed as a percentage, and may be expressed by the relationship $S'=KS$ where S represents either the desired dry particulate input rate or an actual dry measured input rate, and S' represents the desired liquid input rate proportional to the dry particulate input rate S and where K is nominally greater than 1% and less than 99%.

The error signal e produced at output port 143 is provided through the switch means 145 for distribution to the means for controlling liquid input 125 and would then alter the liquid input rate to minimize the error signal e indicating that the desired proportion of liquid to dry particulate in flow has been attained and the characteristic within the pelletizer is once again at its desired level. A minimum signal level for error signal e would be consistent with the output of modulator 133 being at its predetermined level.

The control system is directed to controlling the proportion of mixing of two separate ingredients in the pelletizer. It accomplishes this control by comparing the actual flow of a first of the ingredients with the actual or desired flow of the other of the ingredients so that the correct proportion of the two ingredients may be maintained in the pelletizer.

As previously discussed the control is further refined by the generation of a first signal corresponding to the modulator 133 output signal which is then combined with a second signal corresponding to the actual measured inflow of the said first ingredient.

The means for controlling as shown in FIG. 4 then compares the measured signal M being the combined first and second signals with a third signal corresponding to set point signal. As stated above for this example the set point signal is derived from the inflow of the other ingredient and is converted to a new signal S' by means for converting 147 to correspond to that proportion of the first ingredient for the measured inflow of the other ingredient, so that the correct proportion of first and second ingredients is maintained.

For illustration purposes, a method and means of mixing a dry particulate and a liquid is discussed with reference to the control scheme and where the one ingredient is identified as a liquid and the other ingredient is identified as the dry particulate. However, it should be recognized that the control system can easily be carried out wherein the one ingredient is the dry particulate and the other ingredient is the liquid and wherein the measured signal M to input 137 corresponds to the actual measured dry particulate and the said signal S at input port 141 corresponds to the actual liquid inflow rate which is then converted by converting means 147 to S' corresponding to the proportion of dry particulate corresponding to the rate of liquid inflow and required to produce the desired characteristic in the pelletizer.

It further being recognized that the error signal can then be used to control either alternately the flow of liquid into the pelletizer or the flow of dry particulate into the pelletizer depending upon whether the measure signal at the input port 137 is responsive to inflow of dry particulate or liquid respectively.

In this control scheme, a transducer 109 connected to the means for feeding 103 provides a signal indicative of the actual flow of dry particulate to a switch means 149. Additionally connected to switch means 149 is a generator 151 which can provide a reference signal level. This reference signal level can serve as either a pure reference signal or an artificial desired dry particulate flow rate or an artificial desired liquid flow rate. The switching means 149 provides either the signal output from transducer 109 or signal generator 151 to input port 141. Switching means 149 provides the proper connection to either the signal generator 151 or transducer 109 or transducer 127 depending upon which signal is desired.

As previously discussed, the converting means 147 then converts the said signal S to a new said signal S' as necessary.

As an alternative, the measured signal M can also be made responsive to the actual dry particulate flow rate with the said point signal S, corresponding to the actual liquid flow rate. In this case S' would be that proportion of the dry particulate rate corresponding to the measured inflow rate of the liquid to give the correct proportion of liquid and dry particulate in the pelletizer. S' would be the new said signal for the dry particulate and would be compared with the measured signal M. The measured signal would then comprise the actual dry particulate inflow combined with the modulated signal output from modulator 133.

The transducer 109 would then provide a signal to means 135 indicative of the actual dry particulate inflow rate. Modulator 133 output would be combined with the actual dry particulate inflow rate by means 135 and provided as the measured signal M to input port 137 of the means for controlling 139. A signal responsive to the actual liquid inflow rate provided by means 127 through switching means 149 or a generated signal for a desired liquid inflow rate would be provided by generator 151 through switch means 149 to input port 141 of means for controlling 139. In this case, the converting means 147 converts the said set point signal S to S' corresponding to that proportion of dry particulate required for the measured inflow rate of liquid into the pelletizer to give the correct proportion of liquid to dry material in the pelletizer. It being recognized that in this case where a signal generator 151 is to provide the signal indicative of the desired dry particulate flow rate then signal S could be made to equal signal S' and would be compared with the measured signal M at input port 137 to produce the error signal and no conversion by means 147 would be necessary.

In summary then the control scheme is seen as providing a means for sensing a characteristic in the pelletizer. This means is shown for example by a paddle connected to a transducer 131 which senses movement of the dry and liquid mixture in the pelletizer. A means, being modulator 133, then responsive to that sensed signal provides a first signal modulating about a desired level corresponding to the desired characteristic level. This modulated signal is provided to a means 135 where it is combined with a second signal which may be the actual flow rate for the liquid or which may be the actual flow rate for the dry particulate. This combined signal is then shown as the measured signal M which may be identified as a fourth signal and which is combined in the means for controlling with a set point third signal indicative of a pure reference signal or of the other ingredients. Where the first ingredient would be liquid the other ingredient would be dry particulate and vice versa. The means for controlling, including the means for converting, converts the signal responsive to the other ingredient to the proportionate inflow rate for the first ingredient, as explained above, and compares the measured signal M with the set point signal S'.

As discussed above where the measured signal is the liquid inflow rate the said signal S would be the dry particulate inflow rate which would be converted to signal S' responsive to proportionate amount of liquid required for that measured value of dry particulate flow.

Where the measured signal was of the actual dry particulate flow rate, the set point signal S would correspond to the liquid flow rate and then the converted signal S' would be that proportionate of dry particulate corresponding to the set point rate for liquid.

Additionally discussed above was the use of means 151 for generating a set point signal S corresponding to a desired flow rate for either of the ingredients. In accordance with the preceding the set signals may be converted or not or used as a pure reference signal.

Figure 5:
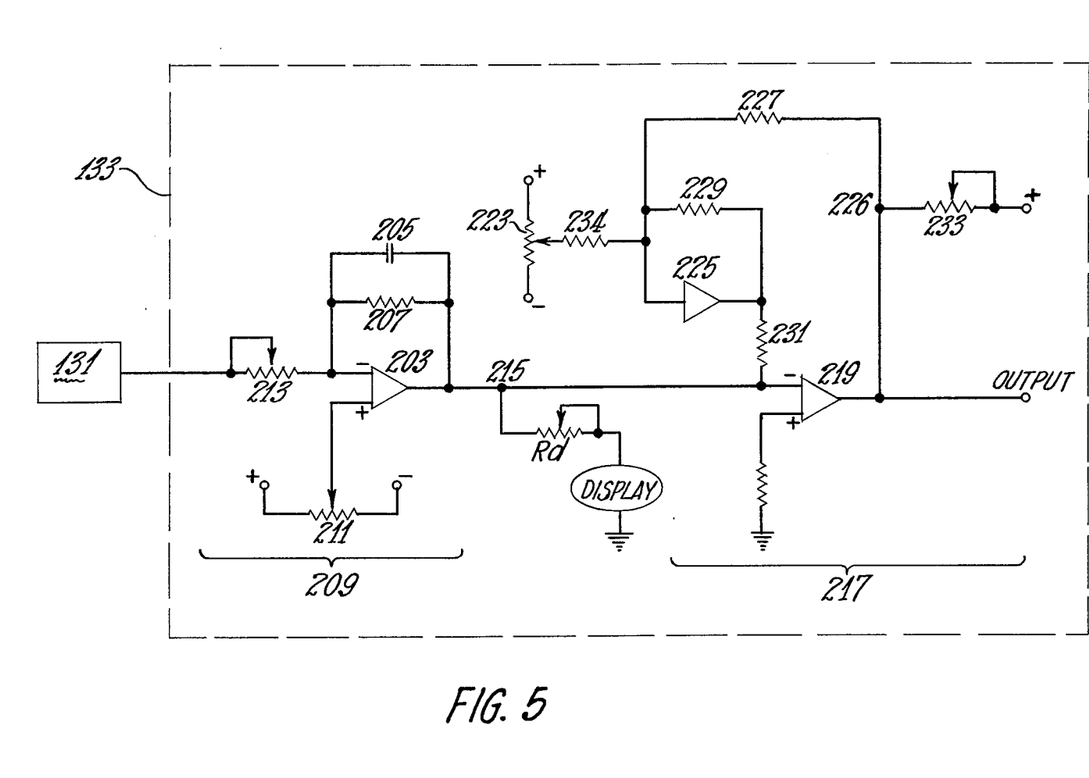
FIG. 5 shows in schematic form the modulator within the control system which produces a signal having a level corresponding to the varying characteristic desired level and varying about the characteristic according to the said characteristic variations.

Referring to FIG. 5, the modulator means 133 is now discussed in detail. The modulator is disclosed and claimed separately in co-pending application Ser. No. 974,419, which was filed on Dec. 29, 1978, and is assigned to the common assignee.

As shown in FIG. 5, the modulator contains two stages, 209 and 217 connected by terminal 215.

Each stage may be used to provide the first signal, responsive to the variations of the characteristic whether liquid or dry particulate and with the other stage being used in a straight through mode. As discussed further, the two stages may be used cooperatively to produce the modulator output signal.

As shown, a transducer 131 has an output connected to the input of the first stage represented by variable resistor 213 which may be used to alter the sensitivity of the integrating amplifier 203 to the input signal. Integrating amplifier 203 has connected in a feed back loop resistance 207 and capacitors 205 to provide the proper time constant as necessary to smooth the fluctuations of the transducer.

An adjustment circuit 209 is shown as a resistance 211 connected between opposite polarities of a power supply and provides a second input to the integrated amplifier 203. The output of the integrated amplifier 203 is provided to terminal 215 which is connected to the input of the second stage 217 and provides an intermediate signal to the second stage, or may be connected to the input of the display device, through resistance Rd, or to any other device wherein the output of the terminal 215 may be displayed.

The second stage 217 is a feedback amplifier stage. The feedback loop comprises of terminal 226, the resistance 227, resistance 229, and resistance 231.

A means for modiying the feedback signal level is shown as amplifier 225, and resistance 223, connected between opposite polarities of a power supply. The output of amplifier 225 is a feedback signal level modified in response to the setting of resistance 223 which is connected to the input of amplifier 225 through resistance 234. Resistance 233 provides a means for changing the sensitivity of amplifier 219.

As stated above, second stage 217 may be used separately in accordance with the principals of this invention. In the case where the second stage is used separately, the first stage is used as a straight through device with the signal at terminal 215 being substantially the signal of the output of transducer 131 and amplifier 203 being a one to one amplifier with or without the integrating capability as may be desired. In this case, the display device may include an amplifier for amplifying the transducer output so as not to load the transducer. The amplifier 219 will provide an output signal at the output port having an amplitude responsive to changes in the sensed signal from transducer 133.

As an alternative, the second stage 217 can be used as a straight throughput device. In this case, the output of transducer 133 is provided to the input of amplifier 203, resistance 213 is then adjusted to control the sensitivity of the signal at output terminal 215 in response to changes in transducer input level. The means for adjusting 211 would provide a signal level into amplifier 203 which is then combined with the transducer signal level to provide a proper output signal level at terminal 215 corresponding to the, output level of the predetermined characteristic level. In this case, the output 215, can be applied to a display device or any other device where the output was to be recorded or displayed.

The modifying means, 223 of stage 217 would be adjusted so that the feed back signal through resistor 231 to the input of amplifier 219 would not affect the signal into the amplifier 219 from terminal 215 and amplifier 219 would be used as a straight one to one amplifier.

In actual practice, the two stages 201 and 217 can be used cooperatively to achieve a maximum effect. In this case, the operator would place the transducer in operation when the pelletizer had reached the point where the characteristic was at its desired level. The operator would adjust means 209 so the signal at the output 215 of the first stage was at the desired level as necessary for a display device or any other instrumentation designed to be responsive directly to the variations of the characteristic. The operator would then cooperatively adjust the means for modifying 223 and the sensitivity control 233 until the output signal was within the proper limits and at the proper level for use with the control instrumentation as shown in FIG. 3.

For example, the control means 139 may require a signal of 5 to 25 milliamps and it may be desired to set the signal level, corresponding to desired characteristic level anywhere from 10 to 14 milliamps.

With this arrangement, the operator can manually control the dry or liquid input flow and observe the effect on the characteristic within the pelletizer as displayed through the output of transducer 131, and the display device. He can place this transducer in operation at the precise moment when the characteristic within the pelletizer has reached the desired characteristic level.

The second stage 217 of the modulator of FIG. 5 can then be used to provide a desired signal output matched to the needs of the larger control system shown in FIG. 4.

It should be recognized, however, that the value of the modulator 133 is in its provision of a modulated signal which follows the movements of the measured characteristic within the pelletizer and about its desired level and which can be adjusted for a level corresponding to the desired characteristic level.

We claim:

1. A method of controlling the size of pellets produced by a pelletizer in which first and second ingredients are supplied thereto, said method comprising the steps of:
   (a) sensing a characteristic indicative of the size of the pellets being produced by said pelletizer and generating a first signal responsive thereto;
   (b) sensing the rate of supply of said first ingredient to said pelletizer and generating a second signal responsive thereto;
   (c) combining said first and second signals to form a third signal;
   (d) comparing said third signal with a set point signal to generate a fourth signal; and
   (e) using said fourth signal to modify the ratio of the rate of supply of said first ingredient to the rate of supply of said second ingredient.

2. A method as recited in claim 1, further comprising the step of integrating said first signal, said integrating step being performed before said combining step.

3. A method as recited in claim 2, wherein said characteristic sensing step comprises sensing the depth of material at a predetermined position on said pelletizer.

4. A method as recited in claim 3, wherein one of said ingredients is liquid and the other is particulate batch material and said using step comprises increasing the ratio of the rate of supply of liquid to the rate of supply of particulate batch material when the depth of said material sensed in said characteristic sensing step decreases and decreasing said ratio when the depth of said material sensed in said characteristic sensing step increases.

5. A method as recited in claim 1, wherein said method further comprises sensing the rate of supply of said second ingredient to said pelletizer and generating a signal responsive thereto for use as said set point signal.

6. A method as recited in claim 1, wherein said first ingredient is liquid.

7. A method as recited in claim 1, wherein said first ingredient is particulate batch material.

8. A method as recited in claim 1, wherein said comparing step comprises generating a fourth signal according to the equation $$e = Kp(S-M) + Ki \int (S-M)dt$$

where
   e: said fourth signal;
   Kp: constant;
   S: said set point signal;
   M: said third signal; and
   Ki: constant.

9. An apparatus for controlling the size of pellets produced by a pelletizer in which first and second ingredients are supplied thereto, said apparatus comprising:
   (a) means for sensing a characteristic indicative of the size of pellets being produced by said pelletizer and generating a first signal responsive thereto;
   (b) means for sensing the rate of supply of said first ingredient and generating a second signal responsive thereto;
   (c) means for generating a set point signal;
   (d) means for combining said first signal with said second signal to form a third signal;
   (e) means for comparing said third signal with said set point signal to generate a fourth signal responsive thereto; and means responsive to said fourth signal for modifying the rate of supply of at least one of said ingredients.

10. An apparatus as recited in claim 9, wherein said comparing means generates a fourth signal according to the equation $$e = Kp(S=M) + Ki \int (S=M)dt$$

where
   e: said fourth signal;
   Kp: constant;
   S: said set point signal;
   M: said third signal; and
   Ki: constant.

11. An apparatus as recited in claim 9, wherein said set point signal is indicative of the rate of supply of said second ingredient.

12. An apparatus as recited in claim 9, wherein said sensing means comprises means for sensing the depth of material at a predetermined position in said pelletizer.

* * * * *

UNITED STATES PATENT AND TRADEMARK OFFICE
CERTIFICATE OF CORRECTION

PATENT NO. : 4,251,475
DATED : February 17, 1981
INVENTOR(S) : Eugene C. Varrasso and Richard K. Henry It is certified that error appears in the above—identified patent and that said Letters Patent is hereby corrected as shown below:

Column 13, line 56: The word "capacitors" should be changed to "capacitators"

Column 14, line 4: The word "modiying" should be changed to "modifying"

Column 16, line 39: The equation should be changed to $$e = K_p (S - M) + K_i \int (S - M) \, dt$$

Signed and Sealed this

Twenty-third Day of June 1981

[SEAL]

Attest:

RENE D. TEGTMEYER

Attesting Officer

Acting Commissioner of Patents and Trademarks